United States Patent
Anders et al.

(10) Patent No.: US 11,178,098 B2
(45) Date of Patent: *Nov. 16, 2021

(54) COMMUNICATION INVERSION FOR ONLINE COMMUNITIES

(71) Applicant: INTERNATIONAL BUSINESS MACHINES CORPORATION, Armonk, NY (US)

(72) Inventors: Kelley L. Anders, East New Market, MD (US); Paul R. Bastide, Ashland, MA (US); Jonathan Dunne, Dungarvan (IE); Trudy L. Hewitt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/426,212

(22) Filed: May 30, 2019

(65) Prior Publication Data

US 2019/0281008 A1    Sep. 12, 2019

Related U.S. Application Data

(63) Continuation of application No. 15/426,353, filed on Feb. 7, 2017, now Pat. No. 10,397,170.

(51) Int. Cl.
*G06F 15/16* (2006.01)
*H04L 12/58* (2006.01)
(Continued)

(52) U.S. Cl.
CPC ............ *H04L 51/32* (2013.01); *G06Q 50/01* (2013.01); *H04L 65/1093* (2013.01);
(Continued)

(58) Field of Classification Search
CPC ... H04L 51/32; H04L 65/1093; H04L 65/403; H04L 67/22; H04L 67/327; G06Q 50/01
See application file for complete search history.

(56) References Cited

U.S. PATENT DOCUMENTS

| 6,934,675 | B2 | 8/2005 | Glinski et al. |
| 9,252,973 | B1 | 2/2016 | Lin et al. |
| (Continued) | | | |

FOREIGN PATENT DOCUMENTS

EP    2988455 A1    2/2016

OTHER PUBLICATIONS

List of IBM Patents or Patent Applications Treated as Related, May 30, 2019, 1 page.

*Primary Examiner* — Brian Whipple
*Assistant Examiner* — Gregory P Tolchinsky
(74) *Attorney, Agent, or Firm* — Michael O'Keefe; Andrew D. Wright; Roberts Calderon Safran & Cole, P.C.

(57) ABSTRACT

Systems and methods for communication inversion for online communities are disclosed. In embodiments, a computer-implemented method comprises: detecting, by a computing device, that an online community has a low vitality; determining, by the computing device and based on the detecting that the online community has a low vitality, a related community is associated with the online community; detecting, by the computing device, a participant communication within the related community; and redirecting, by the computing device, the participant communication to the online community.

14 Claims, 4 Drawing Sheets

(51) Int. Cl.
*G06Q 50/00* (2012.01)
*H04L 29/06* (2006.01)
*H04L 29/08* (2006.01)

(52) U.S. Cl.
CPC ............ *H04L 65/403* (2013.01); *H04L 67/22* (2013.01); *H04L 67/327* (2013.01)

(56) References Cited

U.S. PATENT DOCUMENTS

| | | |
|---|---|---|
| 2011/0107362 A1 | 5/2011 | Reilly et al. |
| 2013/0089850 A1 | 4/2013 | Strong et al. |
| 2014/0025734 A1 | 1/2014 | Griffin |
| 2014/0108562 A1 | 4/2014 | Panzer |
| 2015/0127418 A1 | 5/2015 | Piepgrass et al. |
| 2015/0339335 A1 | 11/2015 | Luo et al. |
| 2015/0341290 A1 | 11/2015 | Cherifi et al. |
| 2016/0125157 A1 | 5/2016 | Wu |
| 2016/0261544 A1 | 9/2016 | Conover |
| 2016/0358214 A1 | 12/2016 | Shalunov et al. |
| 2018/0032884 A1 | 2/2018 | Murugeshan et al. |
| 2018/0089318 A1* | 3/2018 | Chatterjee ............ G06F 16/9535 |
| 2018/0131660 A1* | 5/2018 | Lambert ............ G06Q 30/0202 |
| 2019/0147246 A1* | 5/2019 | Bossut ............... G06K 9/00463 |
| | | 382/103 |

\* cited by examiner

COMMUNICATION INVERSION FOR ONLINE COMMUNITIES

BACKGROUND

The present invention relates generally to online communities and, more particularly, to communication inversion for online communities.

Online social network communities are gathering places for people to discuss topics of mutual interest to members of a particular group. Such online communities are often used within businesses to facilitate and encourage employee communication regarding a particular subject or group of subjects. For example, a company may have a Software Developers online community organized around the general topic of software development, and may have a related community for Commercial Software Developers organized around the topic of developing software for commercial purposes.

In practice, new groups or sub-communities often arise from an original online community, and may be focused on topics of interest that overlap with those of the original online community. The creation of new groups or sub-communities may lead to short or long term loss of member activity or the quality of member activity within the original online community. The diminishing vitality of the original online community may harm the overall quality of discourse within an organization, and can lead to less desirable communication patterns amongst members of the original online community. While solutions have been proposed to assess the vitality of a particular online community, there are presently no adequate solutions to remediate diminishing vitality within an online community.

SUMMARY

In an aspect of the invention, a computer-implemented method includes: detecting, by a computing device, that an online community has a low vitality; determining, by the computing device and based on the detecting that the online community has a low vitality, a related community is associated with the online community; detecting, by the computing device, a participant communication within the related community; and redirecting, by the computing device, the participant communication to the online community.

In another aspect of the invention, there is a computer program product for communication inversion for online communities. The computer program product comprises a computer readable storage medium having program instructions embodied therewith. The program instructions are executable by a computing device to cause the computing device to: detect that an online community has a low vitality based on continuous monitoring of the online community for parameters indicative of vitality of the online community; determine that a related community is associated with the online community; detect a participant communication within the related community; and redirect the participant communication to the online community based on a rule in the rules database.

In another aspect of the invention, there is a system for communication inversion for online communities. The system includes a CPU, a computer readable memory and a computer readable storage medium associated with a computing device; program instructions to detect, based on monitoring an online community of a remote server, that the online community has a low vitality; program instructions to determine that a related community is associated with the online community; program instructions to detect a participant communication within the related community; and program instructions to redirect the participant communication to the online community. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
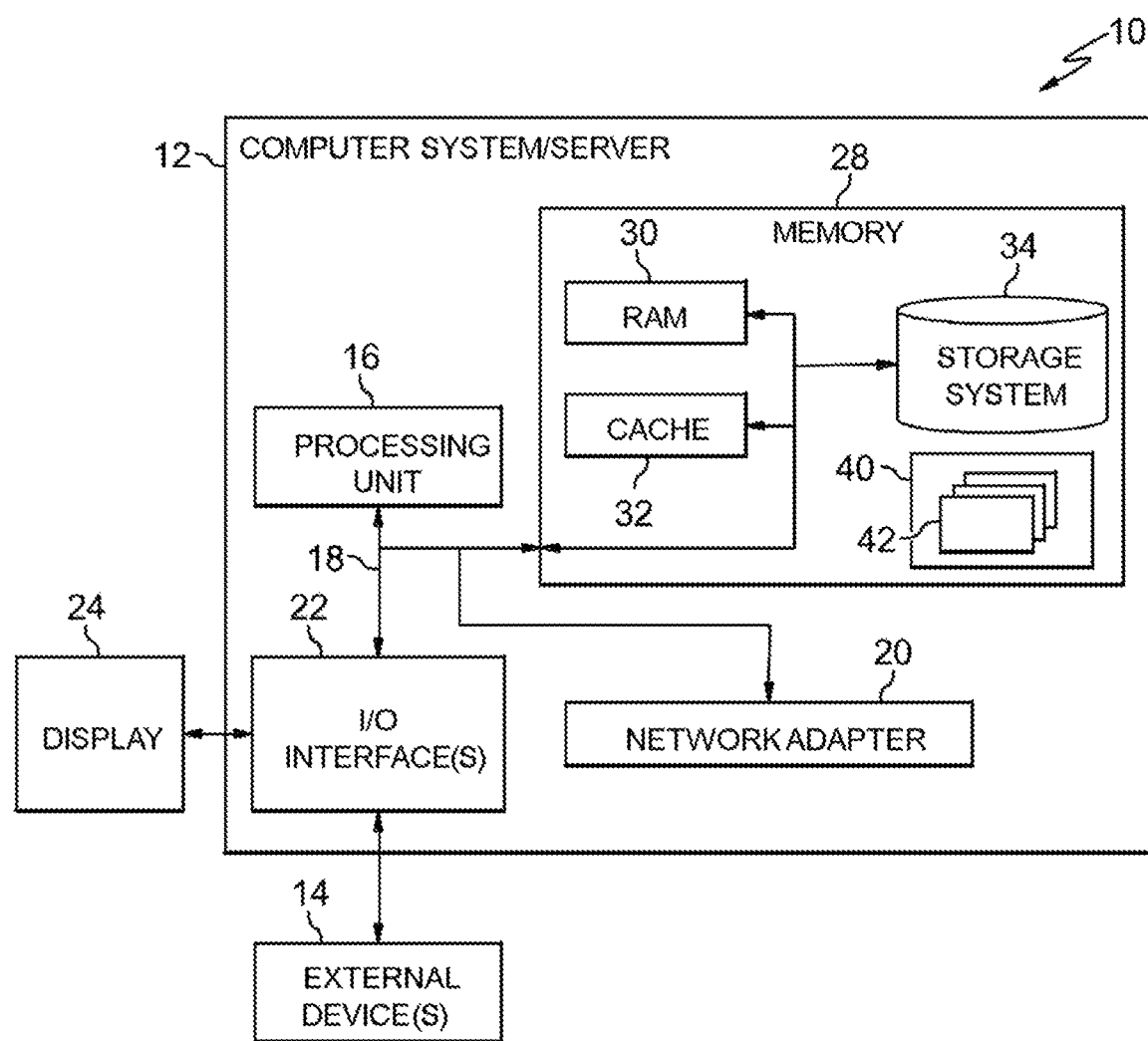
FIG. 1 depicts a computing infrastructure according to an embodiment of the present invention.

The present invention relates generally to online communities and, more particularly, to communication inversion for online communities. In embodiments, the present invention provides a system and method for inverting communication flow between related communities to improve the vitality of a low vitality or low-scoring online community (online social network). In aspects, the invention detects that a first online community has a low vitality, determines if there are any online communities related to the first online community, and redirects organic communications and discovery within any of the related communities to the first online community. In embodiments, the redirection or inversion of communications and discovery from the related communities to the first online community is stopped when the traffic or activity level within the first online community has improved such that it is no longer considered to have low vitality. In aspects, the invention may temporarily invert traffic from the related communities to the first community, and returns to standard traffic patterns after a predetermined period of time. In embodiments, communications redirected from a related community to the first online community are not posted within the related community, thereby preventing duplication of the activity between the related community and the first online community. In aspects, the invention may invert communications from the related community to the first online community only when those communications originate from a specific member or cohort of the related community. In embodiments, the invention may redirect specific files, content, search queries, or specific file types from the related community to the first online community. By way of example, messages linked to a related community may be automatically redirected to the first online community. In embodiments, the invention may reorganize relationships of the communities (e.g., moves a parent online community to a sub online community and vice versa).

In aspects, a system of the present invention may provide survival analysis functions, whereby an analysis of an online community may be conducted to determine which principle components of the online community are contributing to the low vitality of the online community. With these factors determined, activity alerts can be generated to pre-empt declining behavior. Additionally, embodiments of the invention provide for the analysis of online community member/user assessments to determine possible factors contributing to low vitality of the online community, such as whether the members are the wrong audience/members for a particular topic or if the low vitality is due to the quality or content of the online community.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
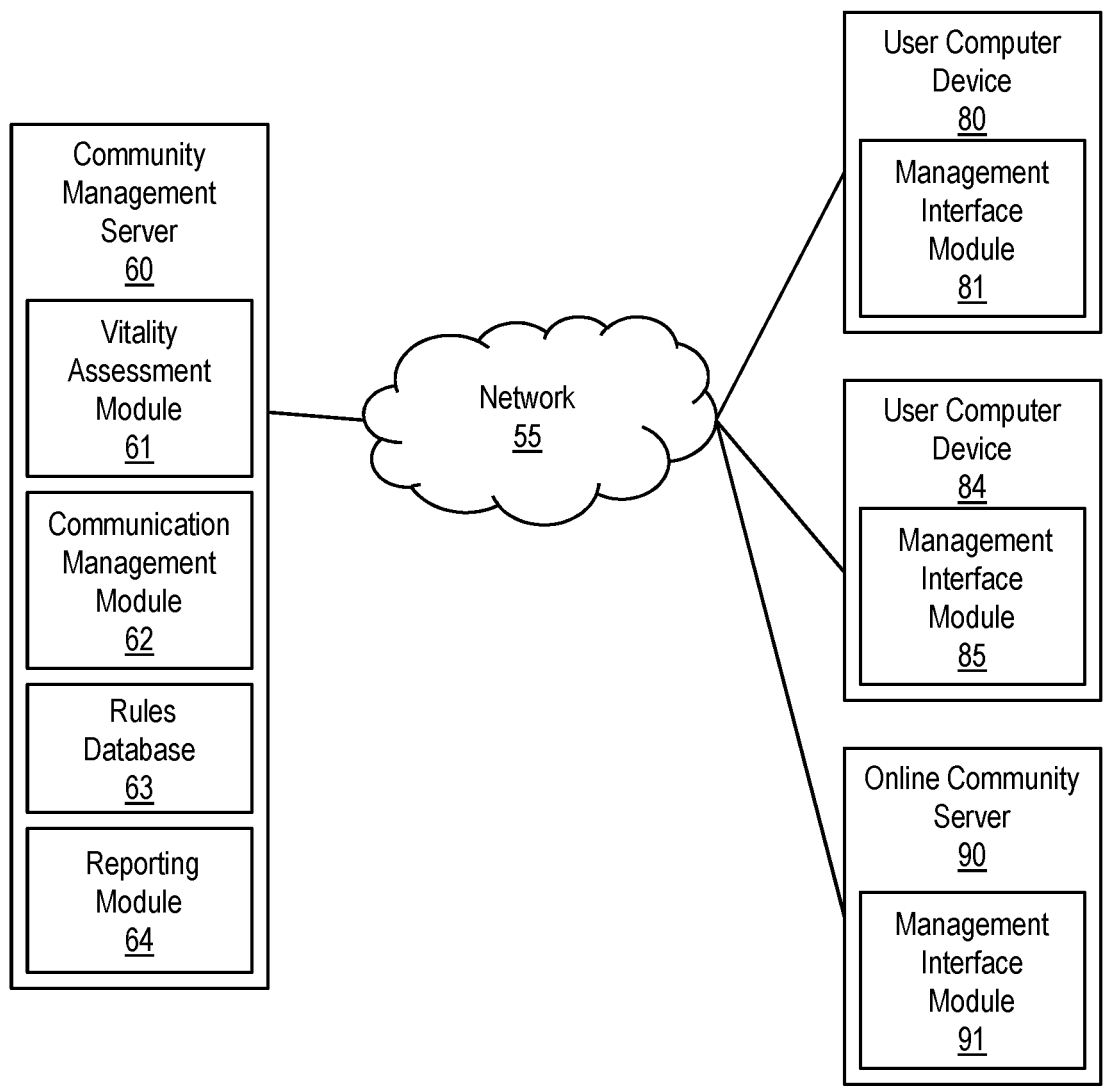
FIG. 2 shows an exemplary environment in accordance with aspects of the invention.

FIG. 2 shows an exemplary environment in accordance with aspects of the invention. The environment includes a community management server 60 connected to a network 55. The community management server 60 may comprise a computer system 12 of FIG. 1, and may be connected to the network 55 via the network adapter 20 of FIG. 1.

The network 55 may be any suitable communication network or combination of networks, such as a local area network (LAN), a general wide area network (WAN), and/or a public network (e.g., the Internet).

The community management server 60 includes a vitality assessment module 61, a communication management module 62, a rules database 63, and a reporting module 64, which are configured to perform one or more of the functions described herein. The vitality assessment module 61, the communication management module 62, and the reporting module 64 may include one or more program modules (e.g., program module 42 of FIG. 1) executed by the community management server 60.

In embodiments, the vitality assessment module 61 is configured to assess the vitality of an online community. The term vitality as used herein refers to aspects of the online community that make the community effective or successful, such as the quantity of communications within the online community and the quality of the communications.

Figure 3:
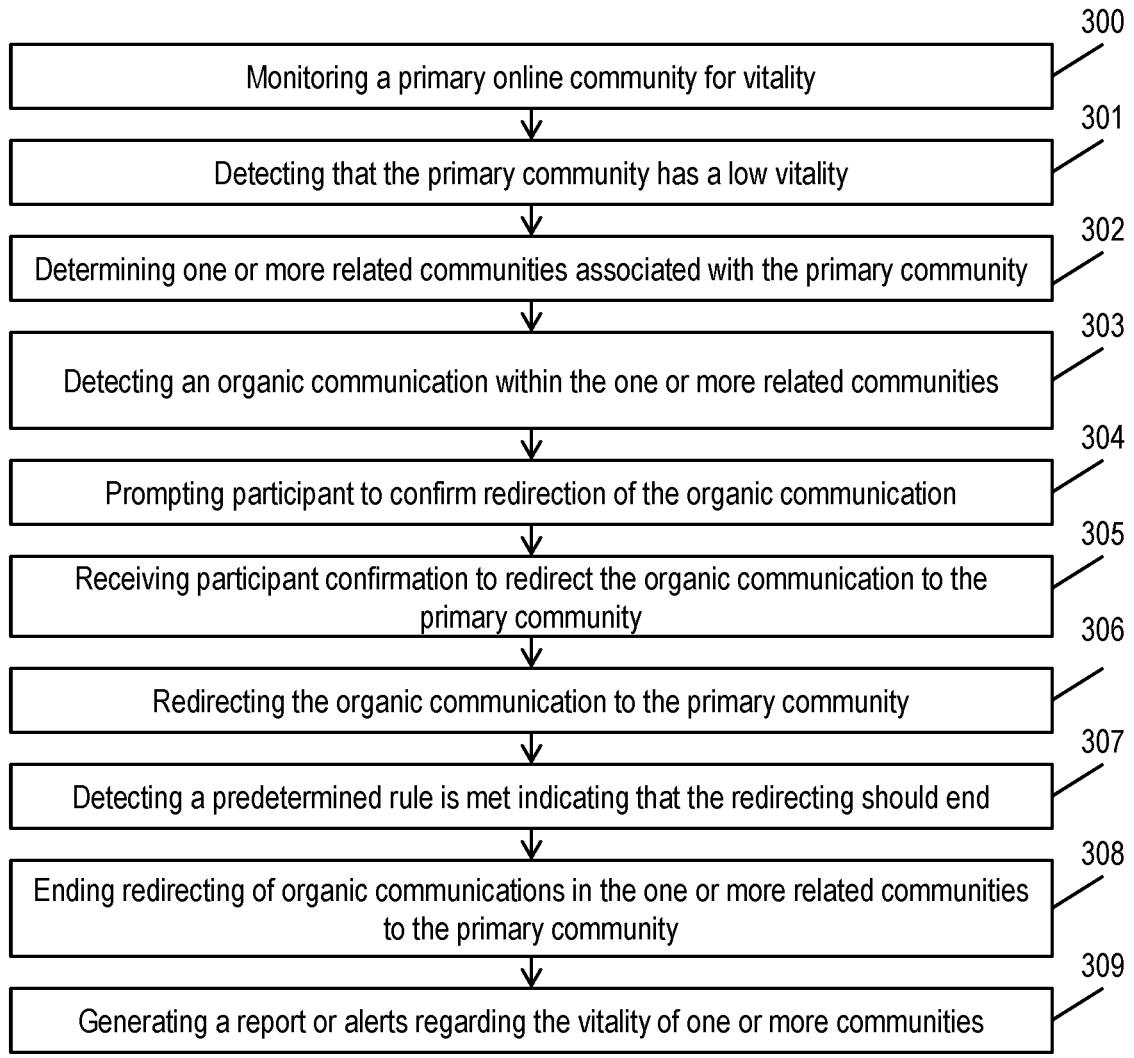
FIG. 3 shows a flowchart of steps of a method in accordance with aspects of the invention.

Additional details regarding the manner in which an online community's vitality may be assessed are described with respect to FIG. 3.

In embodiments, the communication management module 62 is configured to determine one or more online communities related to a low vitality online community, detect organic communications within the one or more online communities, and cause the organic communications to be redirected to the low vitality online community. As used herein, the term organic communication refers to an online community communication originating from a human being. In contrast to an organic communication, an inorganic communication refers to a communication originating with a machine (e.g., a computer or bot-generated communication). Organic communications may include files or documents shared by a member of an online community.

In embodiments, the communication management module 62 manages the redirecting of organic communications based on rules stored in the rules database 63. In embodiments, the reporting module 64 is configured to obtain information regarding an online community of interest, perform assessments regarding the online community, and prepare reports or alerts for one or more users.

Still referring to FIG. 2, the community management server 60 may be configured as a special purpose computing device for managing internal social networks of a business. For example, the community management server 60 may be configured to communicate with a plurality of user computer devices represented at 80 and 84 through the network 55. Alternatively, the community management server 60 may be configured as a special purpose computing device that is part of a third party provider infrastructure. For example, the community management server 60 may be configured to provide online community management services to one or more online community servers represented at 90, wherein the online community server 90 is connected to a plurality of user computer devices 80, 84. The community management server 60 may be configured to communicate with plural different user computer devices 80, 84 and/or online community servers 90 simultaneously, and perform functions separately for each user computer device 80, 84 and/or online community server 90 independent of the others.

The user computer devices 80 and 84 may each be a general purpose computing device, such as a desktop computer, laptop computer, tablet computer, smartphone, etc., and may include components of the computer system 12. In embodiments, the user computer devices 80 and 84 include respective management interface modules 81, 85 facilitating communication between the community management server 60 and users of the user computer devices 80, 84.

The online community server 90 may be a special purpose computing device configured to provide online community services to one or more user computer devices 80 and 84 through the network 55. The online community server 90 may include components of the computer device 12. The online community server 90 may be a third party provider server, such as a server providing social media communication services to multiple users, or may be an in-house server for a business, providing services to online communities within the business. In embodiments, the online community server 90 includes a management interface module 91 configured to perform one or more of the functions described herein. The management interface module 91 may include one or more program modules (e.g., program module 42 of FIG. 1) executed by the online community server 90. In embodiments, the management interface module 91 is configured to communicate with the community management server 60 to manage the flow of organic communications of users of the online community server 90.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300 the community management server 60 monitors one or more online communities for vitality. In aspects, the vitality assessment module 61 of the community management server 60 monitors the vitality of one or more online communities. In embodiments, the community management server 60 obtains information regarding the vitality of an online community serviced by the online community server 90 through communications with the management interface module 91 of the online community server 90.

In embodiments, the vitality assessment module 61 may conduct any of the following steps to gather vitality data: check an amount of posts, responses or other organic communications within the online community; determine a number of posts or other communications from desired (high ranked) members of the online community, a particular group of members within the online community, or a percentage of the online community; evaluate votes (e.g., user questionnaire answers providing qualitative or quantitative data regarding the online community) from owners of the online community or members of the online community; evaluate one or more flags from an owner of the online community or member of the community indicating a problem or concern regarding the vitality of the online community; and determine that posts or other organic communications are not occurring within a predetermined timeframe. Various methods and metrics for evaluating the health or vitality of an online community may be utilized in conjunction with the present invention. Assessment of the vitality of an online community may involve standard deviations and a set number away from the norm (e.g., 2 standard deviations).

At step 301, the community management server 60 detects that the online community has a low vitality utilizing data gathered during the monitoring of step 300. In embodiments, the vitality assessment module 61 of the community management server 60 determines that an online community (hereafter primary online community) has a low vitality (e.g., one or more vitality parameters are below a predetermined threshold value). The vitality assessment module 61 may utilize rules from the rules database 63 to determine that an online community has a low vitality. The rules can be based on a snapshot of an online community at a given time or a trend of the online community over time. By way of example, an administrator may adjust the rules in the rules database 63 such that any community having an activity level that declines a predetermined amount over a predetermined period of time will be considered a low vitality community.

At step 302, the community management server 60 determines that one or more online communities are related to the primary online community. The term related as used herein refers to online communities that have commonalities in membership and subject matter. Related communities may include subgroups of a primary online community, for example. In embodiments, the communication management module 62 determines that one or more online communities are related to the primary community and are considered related communities. In embodiments, the related communities are identified by determining an overlap in membership between a related community and the primary community. For example, the communication management module 62 retrieves membership lists from a database of the community management server 60 and determines overlapping membership by comparing the membership lists.

In embodiments, the related communities are identified by determining an existence of a sub-community (i.e., a sub-community of the primary community). In aspects, a sub-community is in a close relationship with a primary community (parent community) and is included in the overall definition of the primary community. In embodiments, a related community is determined by the communication management module 62 utilizing references that are embedded in the primary community or related communities. For example, metadata of an online community may include relationship data that can assist the communication management module 62 in determining related communities. Alternatively, Uniform Resource Locators (URL's) may provide information regarding relationships between online communities. In aspects, updates, messages and/or content within a community is analyzed by the communication management module 62 to determine if the updates, messages, and/or content include references to the primary community, or vice versa. In embodiments, references to another community may be in the form of hashtags, similar content, or links to content in the other community. In embodiments, the communication management module 62 determines the inverse of a related community. For example, a related community may reference the primary community, while the primary community does not reference the related community.

In step 303, an organic communication is detected within a related community. Various methods may be utilized by the communication management module 62 to detect the creation of a new communication within the related community. In embodiments, the communication management module 62 can detect the creation of a new communication by detecting: push events, wherein content is published to a subscriber, and the subscriber acts on the message (e.g., Gnip™ or compliance application program interfaces); pull events, where content is continuously or periodically monitored for an updated entry added to a message list (e.g., Hootsuite™, Twitter Feed, IBM Connections™ OpenSocial Activity); and streams of content providing a feed that is continuously updated; a user interface (UI) event, where a document object model (DOM) event/UI listener activates an update.

In step 304, optionally, a participant is prompted to confirm redirection of the organic communication detected at step 303 to the primary community. In embodiments, the communication management module 62 sends a user (e.g., the author of the organic communication detected at step 303) a notification through the user computer device 80 requesting authorization to redirect the organic communication. In embodiments, the user can select options utilizing a user interface screen to confirm or deny the redirection of the organic communication.

In step 305, confirmation to redirect the communication is received in response to the prompting of step 304. In embodiments, the community management server 60 receives confirmation from the user computer device 80 to proceed with redirecting the organic communication. In embodiments, the confirmation is received when the user selects the option to confirm redirection of the organic communication utilizing the user interface screen in accordance with step 304. In embodiments, steps 304 and 305 provide for transparent redirecting of communications from one or more related communities to the primary community.

At step 306, the organic communication is redirected from the related community to the primary community. In embodiments, the communication management module 62 causes the redirecting of the organic communication. In embodiments, the communication management module 62 establishes a shim in the messaging infrastructure of the related community that triggers the redirecting process (e.g., steps 304-306), wherein the shim is activated upon detecting the organic communication at step 303. As used herein, the term shim refers to a piece of software code in the software of the online community (related community). In embodiments, the organic communication is altered before being redirected to the primary community. By way of example, a modified organic communication may include a tag or message indicating the originating community (e.g., a hashtag or data identifying the related community from which the message was redirected). In embodiments, the organic communication is a modified organic communication identifying the originating related communication and indicating that the organic communication will be redirected to the primary community for a period of time. In embodiments, the organic communication is posted or published only within the primary community, such that there is no duplication of posted/published material between the primary community and the originating related community. In embodiments, the organic communication is viewable within both the primary community and the originating related community.

In embodiments, the communication management module 62 will honor public or private online community access control lists associated with the primary community and/or related communities. For example, the rules database 63 may include rules prohibiting the redirecting of organic communications between a primary community and a related community when the primary community includes members not authorized to view all communications and/or materials circulated amongst the members of the related community. In another example, the rules database 63 may include rules enabling the redirecting of organic communications between a primary community and a related community only when the communication originates with a member with access to both the primary community and the related community.

Optionally, at step 307, a predetermined rule is met indicating that the redirecting of the organic communication should end. In embodiments, the communication management module 62 utilizes rules in the rules database 63 to determine when the redirecting of the organic communication should end. In embodiments, the organic communication is subject to temporary redirecting, wherein after a predetermined time period (e.g., specified by a rule in the rules database 63), the organic communication reverts back to the originating related community.

At step 308, the community management server 60 ends redirecting of the organic communications between the one or more related communities and the primary community. In embodiments, an administrator may manually end redirecting of communications through a user interface of the community management server 60. In embodiments, the community management server 60 ends the redirecting of organic communications based on detecting that a predetermined rule is met in accordance with step 307.

At step 309, the community management server 60 generates a report or alert regarding the vitality of one or more online communities and/or related communities. In embodiments, the reporting module 64 analyzes data collected during the ongoing monitoring in accordance with step 300, and generates a survival analysis report indicating whether it is likely that one or more participating online communities will maintain a threshold measure of vitality over a predetermined period of time. By way of example, the reporting module 64 of the community management server 60 may determine that redirecting organic participant communications from a related online community to its parent community has revitalized the parent community, and that the vitality of the parent community is likely to maintain its vitality, based on monitoring data gathered by the community management server 60. In embodiments, the community management server 60 generates an alert for a system administrator that indicates that the primary community has a low vitality in accordance with step 301 of FIG. 3. Thereafter, the system administrator may configure rules in the rules database 63 to redirect any new organic communications within a related community to the primary community in accordance with steps 302 and 303 of FIG. 3. Moreover, in embodiments, the reporting module 64 may analyze user assessments received by the community management server 60 to determine possible factors contributing to low vitality of an online community, and may generate a report accordingly. By way of example, the reporting module 64 may send user assessment forms to users through user computer devices 80 and 84, and analyze the responses received to determine that the members of a particular community are the wrong audience for a particular topic, or that a low vitality rating of a community may be due to the low quality of content posted in the community as perceived by the users.

Figure 4:
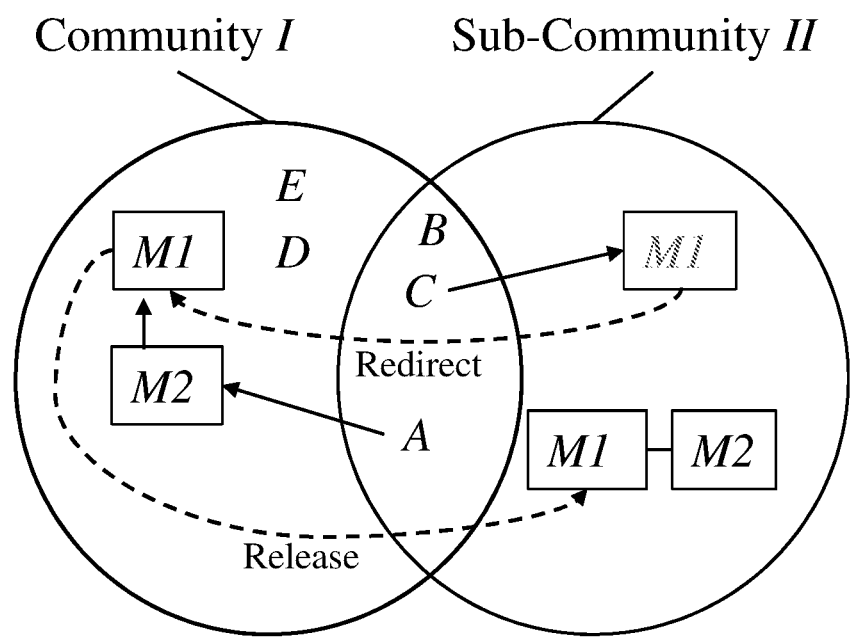
FIG. 4 depicts a diagram of online communities in accordance with an exemplary scenario of the present invention.

FIG. 4 depicts a diagram of online communities in accordance with an exemplary scenario of the present invention. An illustrative example of a method of vitality-based communication inversion in accordance with embodiments of the invention will now be discussed with reference to FIG. 3. In this example, users A, B, C, D and E are members of an online social network. User B creates a community I with users A, B, C, D, and E for Software Developers. User C forms a sub-community II with users A and B—Software Developers for Client X. Sub-community II becomes a more popular community with frequent communications between users A, B and C. Users E and D experience a decrease in value from the primary community (community I) due to the related community (sub-community II). The vitality assessment module 61 monitors the community I in accordance with step 300 of FIG. 3, and detects that the community I has a low vitality due to the decrease in postings from users A, B and C over a period of 6 months in accordance with step 302 of FIG. 3. The community management server 60 determines that sub-community II is related to community I, in accordance with step 302 of FIG. 3, and establishes a shim for sub-community II in relation to community I. In this scenario, user C posts an update M1 to sub-community II. The community management server 60 detects the organic participant communication M1 within the related community of sub-community II in accordance with step 303 of FIG. 3. The communication management module 62 then sends a message to user C, requesting that user C confirm that the update M1 will be redirected from sub-community II to community I in accordance with step 304 of FIG. 3. Upon confirmation from user C in accordance with step 305 of FIG. 3, the community management server 60 redirects the organic participant communication M1 to community I in accordance with step 306 of FIG. 3.

In the example of FIG. 4, user A responds to the update M1 of user C with response M2, and the community management server 60 releases update M1 to the Sub-Community II based on a rule in the rules database 63 indicating that the update M1 should be released to its originating community upon receiving a comment thereon from another user, in accordance with steps 307 and 308.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses online community technology. In return, the service provider can receive payment from the customer(s) under a subscription and/or fee agreement and/or the service provider can receive payment from the sale of advertising content to one or more third parties.

In still another embodiment, the invention provides a computer-implemented method for communication inversion for online communities. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Advantageously, embodiments of the represent an improvement in the technology of online communities (e.g., online community server 90) by providing additional functionality of redirecting electronic communications between online communities to address community vitality concerns, and by providing reporting functions to assist community administrators in managing online communities. In aspects, the present invention may provide improvements to this technology by: prohibiting duplication of activity in related communities; inverting communications to drive a specific cohort to communicate in a low vitality community; including specific files begin uploaded, existing content, etc. in the redirecting step (step 306 of FIG. 3); and reorganizing the relationship of communities and move a parent community to sub-community relationship. In aspects, the invention may be utilized for parent/sub-community relationships such as wikis, which include book-type relationships (chapter-section-paragraph), or may be applied to channels/hashtags on loosely integrated social network messaging systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
 detecting, by a computing device, that one or more parameters, indicating a vitality of an online community as a whole, are below a predetermined threshold value, indicating that the online community as a whole has an unacceptable vitality, wherein the online community comprises a first group of participants and enables communication between the first group of participants;

determining, by the computing device and based on the detecting that the online community as a whole has the unacceptable vitality, an existing related online community is associated with the online community, wherein the existing related online community comprises a second group of participants and enables communication between the second group of participants;

detecting, by the computing device, a creation of a new participant communication within the related online community;

redirecting, by the computing device, the new participant communication from the related online community to the online community based on the determining that the online community as a whole has the unacceptable vitality; and ending the redirecting of the participant communication to the online community, wherein the computing device automatically ends the redirecting of the participant communication when the computer device no longer detects that the online community as a whole has the unacceptable vitality.

2. The method of claim 1, wherein the detecting that the online community as a whole has the unacceptable vitality comprises at least one selected from the group consisting of:

determining, by the computing device, that an amount of participant communications and participant responses within the online community falls below the predetermined threshold level;

determining, by the computing device, that a number of participant communications from a desired subgroup of the first group of participants falls below the predetermined threshold level;

determining, by the computing device, that votes received from the first group of participants of the online community indicate that the online community as a whole has the unacceptable vitality;

receiving, by the computing device, a flag from an owner of the online community indicating that the online community as a whole has the unacceptable vitality; and determining, by the computing device, that a participant communication has not been detected within a predetermined time period.

3. The method of claim 1, further comprising:

prompting, by the computing device, a participant to confirm the redirection of the participant communication; and receiving, by the computing device, a participant confirmation to redirect the participant communication.

4. The method of claim 1, further comprising:

detecting, by the computing device, a response to the participant communication within the online community; and releasing, by the computing device, the response to the related online community.

5. The method of claim 1, wherein the determining the related online community is associated with the online community comprises at least one selected from the group consisting of:

retrieving, by the computing device, a list of the first group of participants participating in the online community and a list of the second group of participants participating the related online community, and determining, by the computing device, an overlap in the first group of participants of the online community and the second group of participants of the related online community;

determining, by the computing device, an existence of a sub-community;

detecting, by the computing device, that a reference embedded in the online community indicates a relationship with the related online community; and detecting, by the computing device, that a reference embedded in the related online community indicates a relationship with the online community.

6. The method of claim 1, further comprising creating an update in the related community referencing the participant communication.

7. The method of claim 1, further comprising identifying that the participant communication is a type of predetermined communication to be redirected prior to the redirecting of the participant communication.

8. A computer program product for communication inversion for online communities, the computer program product comprising a computer readable storage medium having program instructions embodied therewith, the program instructions executable by a computing device to cause the computing device to:

detect that an online community has an unacceptable vitality based on continuous monitoring of the online community for parameters indicative of vitality of the online community, wherein the online community enables online communication between a first group of participants;

determine that an existing related online community is associated with the online community, wherein the existing related online community enables online communication between a second group of participants;

detect a participant communication within the related online community;

redirect the participant communication to the online community based on the detecting that the online community has the unacceptable vitality and based on a rule in a rules database; and end the redirecting of the participant communications from the related online community to the online community, wherein the computing device automatically ends the redirecting of the participant communications when the computer device no longer detects that the online community has the unacceptable vitality.

9. The computer program product of claim 8, wherein the program instructions further cause the computing device to perform at least one selected from the group consisting of:

determine that an amount of participant communications and participant responses within the online community falls below a predetermined threshold level;

determine that a number of participant communications from a desired subgroup of the first group of participants falls below a predetermined threshold level;

determine that votes received from the first group of participants of the online community indicate that the online community has the unacceptable vitality;

determine that a flag received from an owner of the online community indicates that the online community has the unacceptable vitality; and determine that a participant communication has not been detected within a predetermined time period.

10. The computer program product of claim 8, wherein the program instructions further cause the computing device to: identify that the participant communication is a type of predetermined communication to be redirected prior to the redirecting of the participant communication.

11. The computer program product of claim 8, wherein the program instructions further cause the computing device to:
   prompt a participant to confirm the redirection of the participant communication; and
   receive a participant confirmation to redirect the participant communication.

12. The computer program product of claim 8, wherein the program instructions further cause the computing device to perform at least one selected from the group consisting of:
   retrieve a list of the first group of participants participating in the online community and a list of the second group of participants participating the related online community, and determining, by the computing device, an overlap in the first group of participants of the online community and the second group of participants of the related online community;
   determine an existence of a sub-community;
   detect that a reference embedded in the online community indicates a relationship with the related online community; and
   detect that a reference embedded in the related online community indicates a relationship with the online community.

13. A system for communication inversion for online communities, comprising:
   a CPU, a computer readable memory and a computer readable storage medium associated with a computing device;
   program instructions to detect, based on monitoring an online community of a remote server, that the online community has an unacceptable vitality level based on at least one vitality parameter meeting a predetermined threshold value indicating the unacceptable vitality level, wherein the online community enables online communication between a first group of participants;
   program instructions to determine that a related online community is associated with the online community, wherein the related online community enables online communication between a second group of participants;
   program instructions to detect a participant communication within the related online community;
   program instructions to redirect the participant communication to the online community based on the detecting the unacceptable vitality level; and
   program instructions to automatically end the redirecting of the participant communication when the computer device no longer detects that the online community has the unacceptable vitality.

14. The system of claim 13, further comprising program instructions to generate a report or alert regarding the vitality of the online community.

\* \* \* \* \*